US011655057B1

(12) United States Patent
Greenberg et al.

(10) Patent No.: US 11,655,057 B1
(45) Date of Patent: May 23, 2023

(54) MOUNTS FOR UNMANNED AERIAL VEHICLES

(71) Applicant: The ADT Security Corporation, Boca Raton, FL (US)

(72) Inventors: Trevor Greenberg, Louisville, KY (US); David Brandon Smith, Ft. Worth, TX (US); Isaac C. Dearmond, North Richland Hills, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/087,784

(22) Filed: Dec. 22, 2022

(51) Int. Cl.
*B64U 80/00* (2023.01)
*B64U 101/31* (2023.01)

(52) U.S. Cl.
CPC .......... *B64U 80/00* (2023.01); *B64U 2101/31* (2023.01)

(58) Field of Classification Search
CPC .. B64U 80/00; B64U 2101/31; B64C 39/024; B64F 1/222
See application file for complete search history.

(56) References Cited

U.S. PATENT DOCUMENTS

| | | | |
|---|---|---|---|
| 5,911,661 A * | 6/1999 | Murray | H02G 3/185 174/491 |
| 7,267,314 B1 | 8/2007 | Erickson | |
| 7,486,251 B2 * | 2/2009 | Chan | E04B 9/006 343/878 |
| 7,795,533 B2 * | 9/2010 | Bravo | H02G 3/16 52/39 |
| 8,083,300 B2 * | 12/2011 | MaCall | H05K 5/0204 312/223.1 |
| 10,608,315 B2 * | 3/2020 | Anolik | H01Q 1/1207 |
| 10,958,835 B1 | 3/2021 | Bart et al. | |
| 11,011,066 B2 * | 5/2021 | Ben-David | B64C 39/024 |
| 11,086,312 B2 * | 8/2021 | Charlton | G05D 1/0011 |
| 11,308,815 B2 * | 4/2022 | Speasl | B64F 1/222 |
| 11,328,614 B1 | 5/2022 | Bart et al. | |
| 2013/0251181 A1 | 9/2013 | Stewart, Jr. et al. | |
| 2014/0223726 A1 * | 8/2014 | Bryant | H01Q 1/1214 29/601 |
| 2017/0170573 A1 * | 6/2017 | Korva | H01Q 1/38 |

(Continued)

FOREIGN PATENT DOCUMENTS

KR 102289705 B1 * 8/2021 ............. B64U 50/34

*Primary Examiner* — Benjamin P Lee
(74) *Attorney, Agent, or Firm* — Christopher & Weisberg, P.A.

(57) ABSTRACT

An apparatus for supporting a ceiling mounted unmanned aerial vehicle docking station in a premises security system is provided for a premises including a ceiling grid and a support structure disposed above the ceiling grid. The apparatus includes an unmanned aerial vehicle docking station mounting bracket including a top surface and a bottom surface which is affixable to an exposed surface of a ceiling element in the ceiling grid by a first plurality of fastening elements. The bottom surface of the bracket is affixable to the ceiling mounted unmanned aerial vehicle docking station. The apparatus further includes a panel including a top surface and a bottom surface which is affixable to a concealed surface of the ceiling element by the first plurality of fastening elements. The top surface of the panel includes at least one anchoring element for physically coupling the panel to the support structure.

9 Claims, 11 Drawing Sheets

(56) References Cited

U.S. PATENT DOCUMENTS

| | | | |
|---|---|---|---|
| 2018/0131071 A1* | 5/2018 | Anolik | H01Q 1/007 |
| 2018/0178667 A1* | 6/2018 | Cumoli | G06T 7/70 |
| 2018/0245365 A1* | 8/2018 | Wankewycz | B64C 39/024 |
| 2018/0304981 A1* | 10/2018 | Piette | B64B 1/22 |
| 2018/0305010 A1* | 10/2018 | Baracaldo Angel | G08B 17/10 |
| 2019/0002127 A1* | 1/2019 | Straus | G08G 5/0091 |
| 2019/0002128 A1* | 1/2019 | Raz | B64C 39/024 |
| 2019/0383476 A1* | 12/2019 | Lee | F21V 21/112 |
| 2020/0166925 A1* | 5/2020 | Charlton | B64C 39/024 |
| 2021/0063120 A1* | 3/2021 | Taveniku | G06V 20/52 |
| 2021/0309359 A1 | 10/2021 | Ratajczak et al. | |
| 2021/0347500 A1* | 11/2021 | Hagan | B64C 39/024 |
| 2022/0019247 A1* | 1/2022 | Dayan | B64F 1/222 |
| 2022/0028286 A1* | 1/2022 | Amsili | G05D 1/104 |
| 2022/0050479 A1* | 2/2022 | Hurst | G05D 1/104 |
| 2022/0066473 A1 | 3/2022 | Ben-David et al. | |
| 2022/0073214 A1* | 3/2022 | Liske | B64F 1/32 |
| 2022/0084421 A1 | 3/2022 | Ben-David et al. | |
| 2022/0177125 A1* | 6/2022 | Abdellatif | B64U 30/20 |
| 2022/0223058 A1* | 7/2022 | Prieto | B64U 70/00 |

* cited by examiner

MOUNTS FOR UNMANNED AERIAL VEHICLES

TECHNICAL FIELD

The present technology is generally related to unmanned aerial vehicles (often referred to as "drones"), and particularly, to apparatuses and methods for supporting unmanned aerial vehicles that may be used in premises security systems.

BACKGROUND

Existing systems for supporting unmanned aerial vehicles (UAVs), such as ceiling mounted or wall mounted drone docking stations, may require complex and expensive installation in a premises, and furthermore, may not be suitable for various different structure types, ceiling types, wall types, etc.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
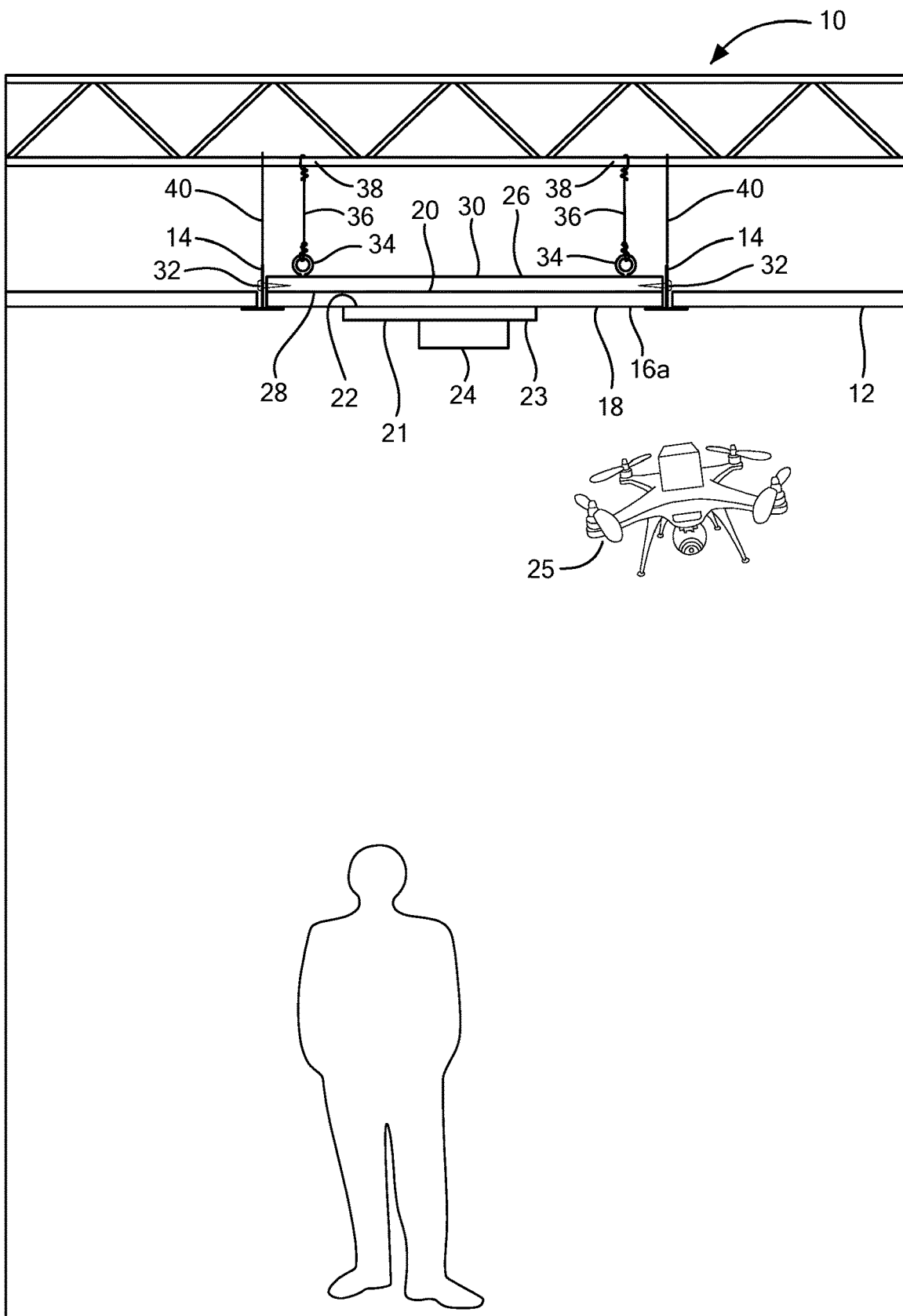
FIG. 1 is a block diagram that illustrates an example unmanned aerial vehicle docking station for a ceiling, according to some embodiments of the present disclosure.

Before describing in detail exemplary embodiments, it is noted that the embodiments may reside in combinations of apparatus components and processing steps related to apparatuses and methods for supporting unmanned aerial vehicles in premises security systems. Accordingly, components have been represented where appropriate by conventional symbols in the drawings, focusing only on those specific details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include, e.g., wires, ropes, cabling, etc., which physically connects one or more elements, structures, apparatuses, etc.

In some embodiments described herein, the terms "top", "bottom," "upper", "lower" etc., may be used to refer to a surface, structure, etc., being above or below a certain reference plane. This is done for ease of understanding the relationship among the components. For example, in the case of a panel which is horizontal and planar, an upper/top surface may face the ceiling/roof/sky/etc., while the bottom surface may face the floor/ground/etc. It is to be understood that the orientation of the reference plane (e.g., panel) may change, for example, if the panel were flipped 180-degrees along its horizontal axis, in which case "top", "bottom," "upper", etc., may still be used to refer to opposite sides of the reference plane, although the "top" surface may face the ground and the "bottom" surface may face the roof. The phrase "about 'value X,'" or "approximately value X," as used in the present disclosure means within 10% of the "value X." For example, a value of about 1 or approximately 1 would mean a value in the range of 0.9-1.1.

The terminology used herein is for the purpose of describing particular embodiments only and is not intended to be limiting of the concepts described herein.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Ceiling mounted unmanned aerial vehicles, e.g., unmanned aerial vehicles which mount (connectively couple) to a docking station (e.g., charging station) which is attached to a ceiling, present particular challenges. For example, an unmanned aerial vehicle may have a significant weight (e.g., 25 lbs.), which may require significant support to maintain stability and prevent the structure from becoming dislodged, e.g., during a fire emergency or structural failure. In some embodiments, a docking station may include a magnetic element which connectively couples to a corresponding magnetic element of an unmanned aerial vehicle. When an unmanned aerial vehicle undocks and decouples from the magnetic element of the docking station, it may cause a downward and/or upward force to be applied to the docking station. Similarly, when an unmanned aerial vehicle docks and couples its magnetic element to the magnetic element of the docking station, it may cause a downward and/or upward force to be applied to the docking station. Thus, for at least these reasons, a ceiling mounted docking station may experience significant upward and downward force and/or pressure (e.g., 50 lbs.), which may present particular challenges for stabilizing and securing the structure. Some embodiments of the present disclosure address these particular challenges by providing stabilizing and securing structures, as described herein.

Thus, according to some embodiments of the present disclosure, a ceiling bracing may allow for tension to be maintained while load bearing. In some embodiments, up to 50 lbs. may be supported. The ceiling bracing of some embodiments may allow for tension to also be applied upward. For example, upward pressure of up to 30 lbs. may be supported in some embodiments. This upward pressure may result, e.g., from magnetic docking of unmanned aerial vehicles with a docking station. The ceiling bracing of some embodiments may secure the unmanned aerial vehicle docking station to prevent it from moving substantially in any direction. This may be advantageous for serving as a solid base for installation. The ceiling bracing of some embodiments may reduce or eliminate ceiling substrate movement without necessarily affecting the grid structure of a ceiling.

Referring now to the drawing figures in which like reference designators refer to like elements, FIG. 1 depicts a first example unmanned aerial vehicle docking station for a ceiling, according to embodiments of the present disclosure.

In the example of FIG. 1, a premises security system 10 includes a ceiling 12, which includes a ceiling grid 14 and at least one ceiling element 16 secured by the ceiling grid 14. In some embodiments, ceiling 12 is a suspended ceiling. In some embodiments, the ceiling element 16 is a ceiling tile. In some embodiments, the ceiling 12 is arranged in a substantially horizontal plane. The ceiling element 16 includes an exposed surface 18 (e.g., facing down, i.e., visible to a person standing below the ceiling), and a concealed surface 20 (e.g., facing up) opposite the exposed surface 18. An unmanned aerial vehicle mounting bracket 21 is secured to the exposed surface 18 of the ceiling element 16. The unmanned aerial vehicle mounting bracket 21, which includes a top surface 22 and a bottom surface 23 opposite the top surface 22, is configured and/or adapted to support and/or couple to an unmanned aerial vehicle docking station 24, such as a magnetic unmanned aerial vehicle docking station 24, for an unmanned aerial vehicle 25 in a premises security system 10.

A panel 26 (e.g., a plywood sheet) may be affixed to the concealed surface 20 of the ceiling element 16. In some embodiments, the panel 26 may be approximately the same size as the ceiling element 16. In some embodiments, a bottom surface 28 of panel 26 may be affixed to the concealed surface 20 of the ceiling element 16. The panel 26 includes a top surface 30 opposite the bottom surface 28. The panel 26 may be affixed to the ceiling grid 14, e.g., using fastening elements 32. In some embodiments, anchoring elements 34 (e.g., eye bolts) may be affixed to panel 26, e.g., the top surface 30 of panel 26. At least one coupling 36 (e.g., hanger wire, rods, cabling, etc.) may couple the anchoring elements 34 to at least one structural support element 38 (e.g., red iron in the building structure).

The ceiling grid 14 may be secured to at least one structural element 38 via at least one coupling 40. This may be the same and/or different at least one structural element 38 to which the coupling(s) 34 may be connected.

In some embodiments, it may be assumed that the ceiling 12, ceiling element 16, and/or ceiling grid 14 may be sized according to a standard size, but embodiments of the present disclosure are not limited to standard-sizes. For example, the ceiling 12 may conform to the standards of the International Building Code, and/or any other appropriate standard setting organization.

Figure 2:
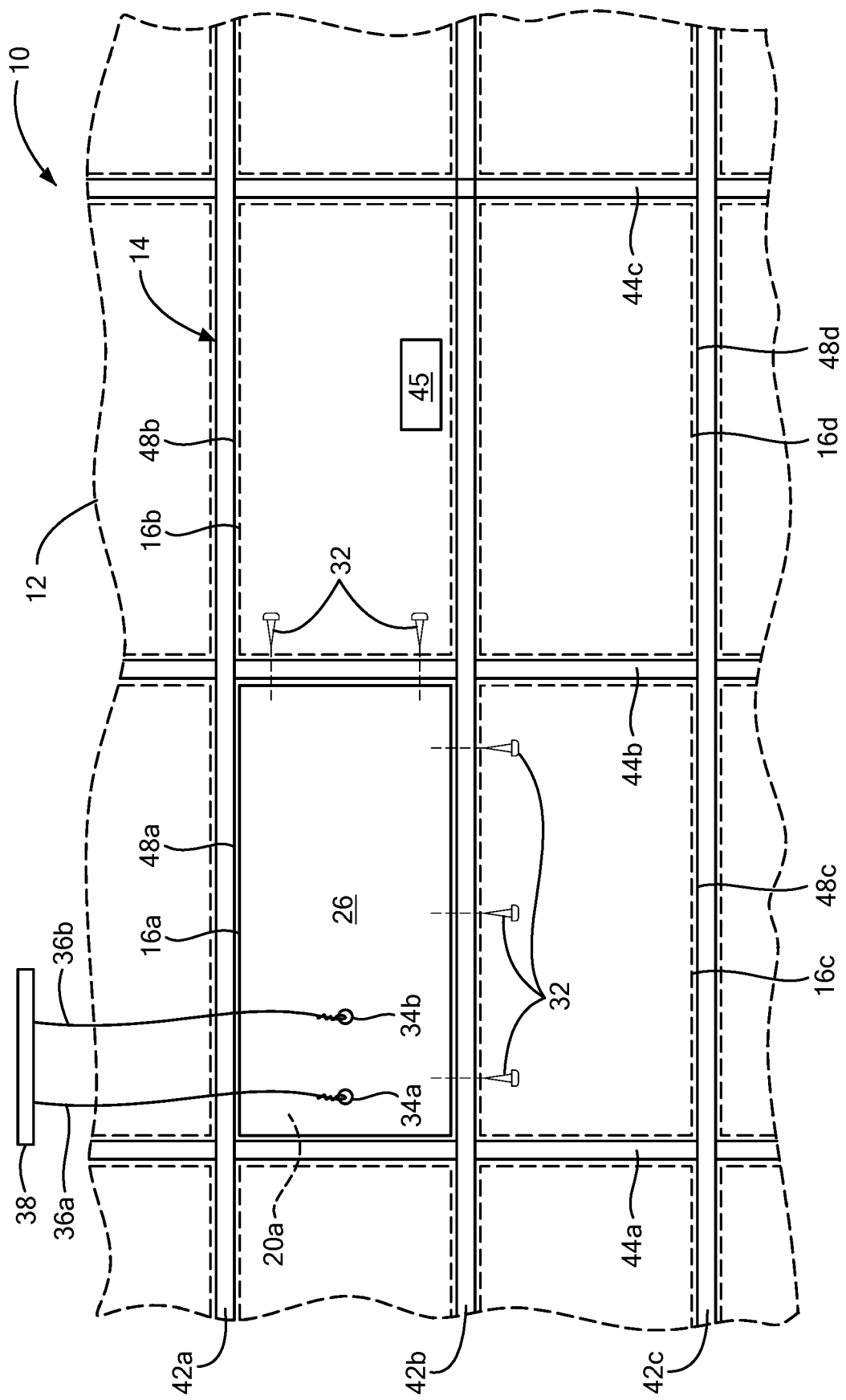
FIG. 2 is a block diagram that illustrates another example unmanned aerial vehicle docking station for a ceiling, according to some embodiments of the present disclosure.

Referring to FIG. 2, which depicts an example of premises security system 10 depicted in FIG. 1, a ceiling grid 14 in a ceiling 12 includes main beams 42a, 42b, and 42c (collectively, "main beams 42") and cross beams 44a, 44b, and 44c (collectively, "crossbeams 44"). In some embodiments, main beams 42 may be arranged in parallel to one another, and may be arranged perpendicular to one or more cross beams 44. In some embodiments, main beams 42 and/or cross beams 44 may be "T"-shaped.

In some embodiments, a power supply 45 for the unmanned aerial vehicle docking station 24 may be affixed to the main beams 42, the cross beams 44, and/or panel 26.

The main beams 42 and cross beams 44 may intersect at right angles in some embodiments. The main beams 42 and cross beams 44 may be affixed to one another according to a variety of suspended ceiling grid assembly techniques. Openings 48a, 48b, 48c, and 48d (collectively, "openings 48") are formed by the intersections of main beams 42 and cross beams 44. The ceiling elements 16a, 16b, 16c, and 16d (collectively, "ceiling elements 16") are disposed in the respective openings 48a, 48b, 48c, and 48d, and may be secured to the main beams 42 and cross beams 44 according to a variety of ceiling assembly techniques. In some embodiments, the ceiling elements 16 are ceiling tiles, which may be made of any suitable material (e.g., mineral wool, fiberglass, gypsum, perlite, clay, cellulose, vinyl, starch, metal, glass, wood, Styrofoam, Polyvinyl chloride, urethane, plastic, cork, etc.).

Referring still to FIG. 2, panel 26, which may be, for example, ¾ in. thick plywood cut to the shape of a ceiling element 16a, is disposed on the concealed surface 20a of the respective ceiling element 16a. Other thicknesses and dimensions for panel 26 may be used. In some embodiments, fastening elements 32 may affix the panels 26 to one or more of the adjacent main beams 42 and/or cross beams 44. For example, fastening elements 32 may be driven through the main beams 42 into one or more sides 50 of respective panels 26. Additionally, or alternatively, brackets may support and affix the panel 26 to the main beams 42 and/or cross beams 44.

Referring still to FIG. 2, anchoring elements 34a and 34b (collectively "anchoring elements 34") may be affixed to panel 26, e.g., top surface 30 of panel 26. Couplings 36a and 36b (e.g., hanger wire, rods, cabling, etc.) may couple the respective anchoring elements 34a and 34b to at least one structural support element 38 (e.g., red iron in the building structure).

Figure 3:
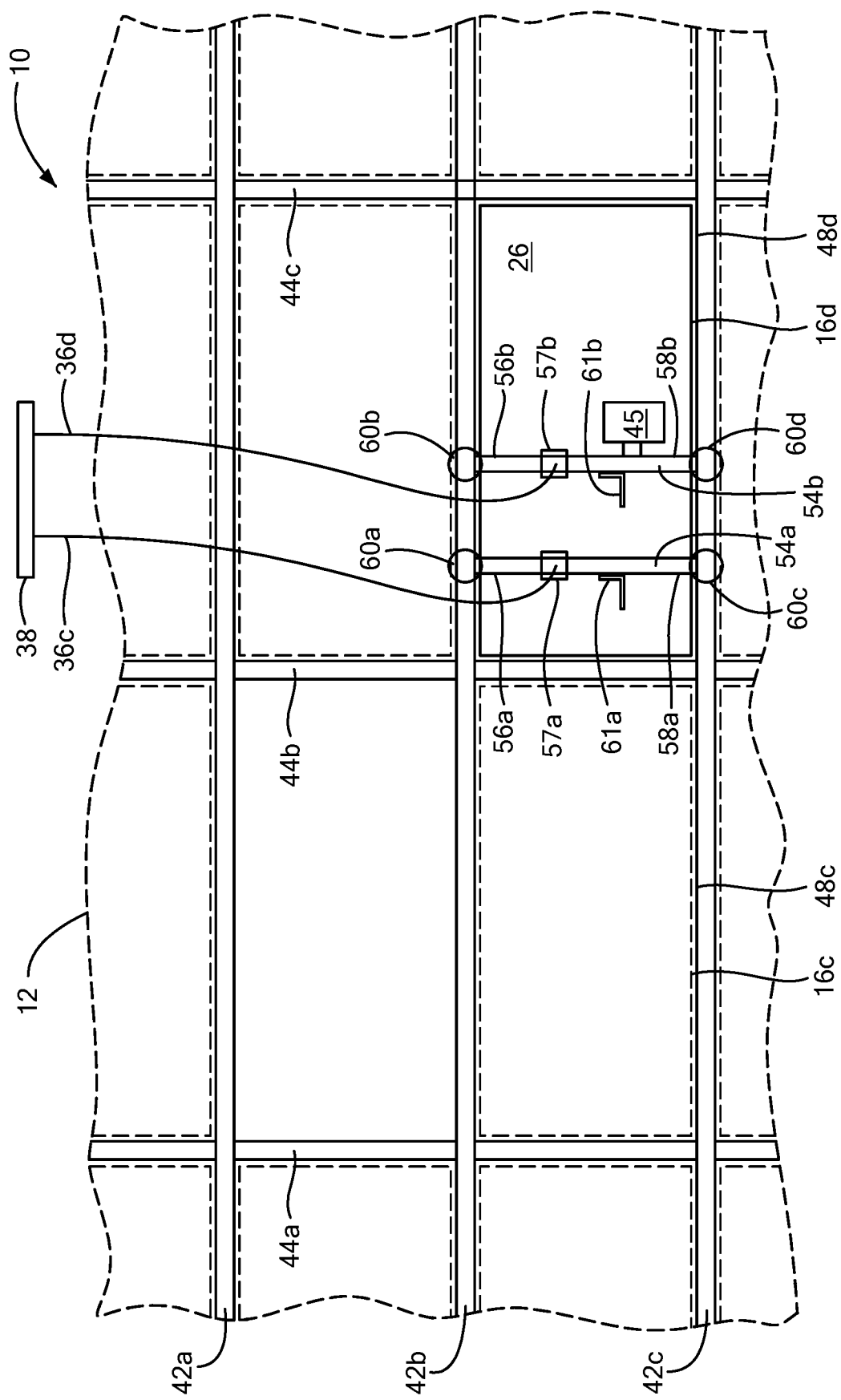
FIG. 3 is a block diagram that illustrates another example unmanned aerial vehicle docking station for a ceiling, according to some embodiments of the present disclosure.

Referring to FIG. 3, which illustrates an example modification of the embodiment illustrated in FIG. 2, the ceiling grid 14 may further include cross braces 54a and 54b (collectively, "cross braces 54"), which may include first ends 56a and 56b affixed to main beam 42b and second ends 58a and 58b affixed to main beam 42c. The cross braces 54a and 54b may, in some embodiments, be perpendicular to the main beams 42 and/or parallel to the cross beams 44. In some embodiments, the cross braces 54 may not be perpendicular or parallel to either main beams 42 or cross beams 44. In some embodiments, the cross braces 54 may be formed of a metal material, and may be mounted to the ceiling grid 14 (e.g., to main beams 42b and 42c, and/or to cross beams 44) via fastening elements 60a and 60b, and 60c and 60d, such as clips, e.g., attached to first ends 56a and 56b and second ends 58a and 58b, respectively. In some embodiments, cross braces 54a and 54b may include apertures 57a and 57b, respectively (and/or eye bolts or other anchoring hardware), which may be for receiving couplings 36c and 36d, which may be coupled to structural support element 38. In some embodiments, power supply 45 may be affixed to one or more of the cross braces 54. In some embodiments, the cross braces 54 may be affixed to panel 26, e.g., via fastening elements 61a, 62b (e.g., angle brackets). In some embodiments, the example of FIG. 3 may be combined with the example of FIG. 2 so as to provide additional support.

Figure 4:
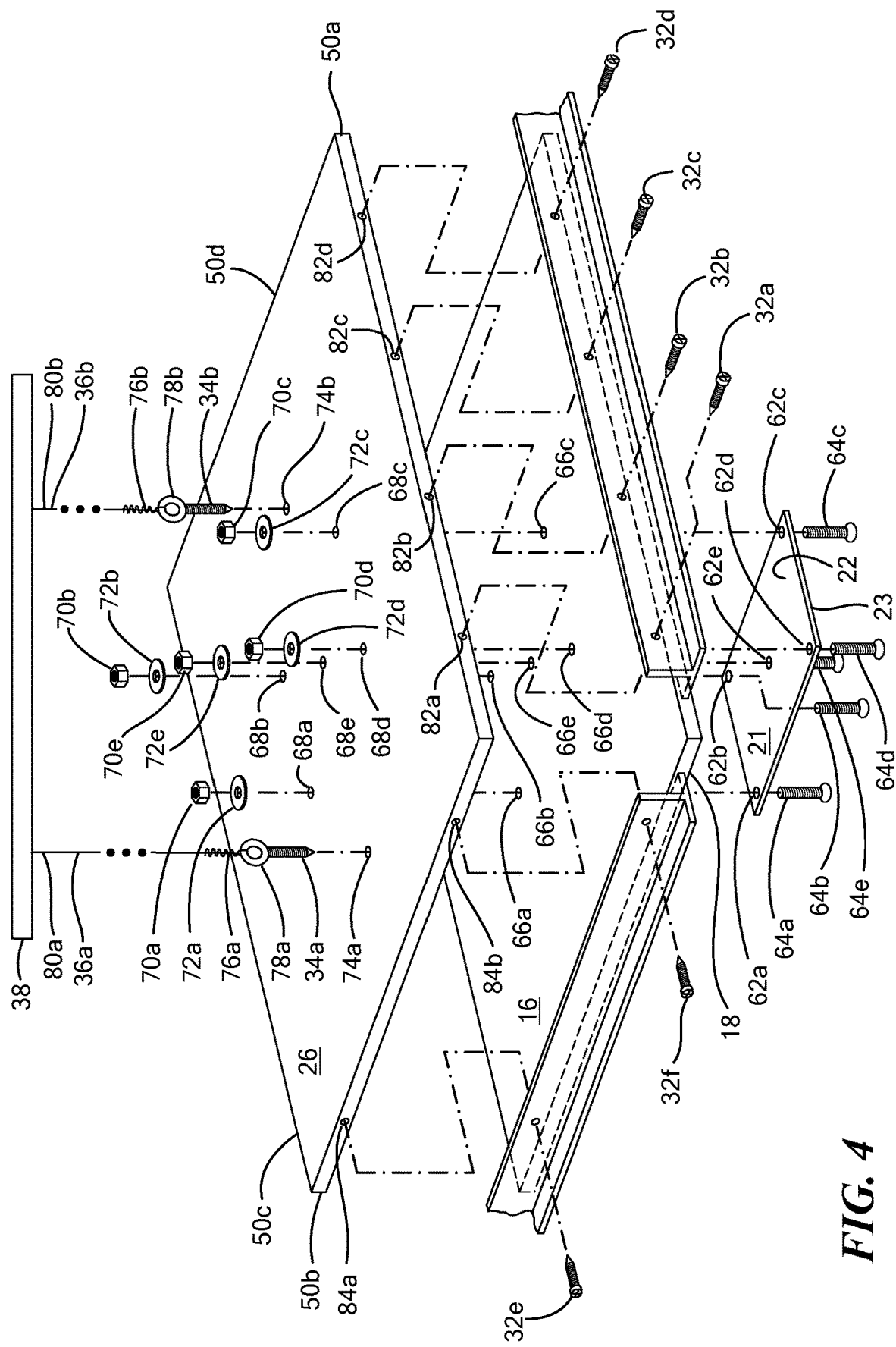
FIG. 4 is a block diagram that illustrates another example unmanned aerial vehicle docking station for a ceiling, according to some embodiments of the present disclosure.

FIG. 4 illustrates another example embodiment of a premises security system 10 including a ceiling mounted unmanned aerial vehicle docking station 24. In FIG. 4, the ceiling grid 14 is omitted from the illustration for clarity, but it is understood that the features of the premises security system 10 depicted in FIG. 4 may apply to any of the systems 10 depicted in FIG. 1, FIG. 2, or FIG. 3.

In the example of FIG. 4, a ceiling element 16, e.g., a ceiling tile, is disposed between an unmanned aerial vehicle mounting bracket 21 and a panel 26. In some non-limiting embodiments the ceiling element 16 can be 2'×4'. The panel 26 may be approximately the same dimensions as the ceiling element 16, and/or may vary in one or more dimensions. For example, the panel 26 may be a 2'×4' plywood panel (i.e., 4' long, 2' wide rectangular shape), with an example thickness of ½ inch, which may be thicker or thinner than the width of the ceiling element 16. In some embodiments, the unmanned aerial vehicle mounting bracket 21 may be affixed to an exposed surface 18 of the ceiling element 16. The unmanned aerial vehicle mounting bracket 21 may include a plurality of fastening apertures 62a, 62b, 62c, 62d, and 62e (collectively, fastening apertures 62) for receiving respective fastening elements 64a, 64b, 64c, 64d, and 64e (collectively, fastening elements 64). For example, the fastening elements 64 may be #8-32×2 in. Flat Head Phillips screws, M4 screws, etc. Other types and dimensions of fastening elements may be used. Ceiling tile 16 may include a plurality of fastening apertures 66a, 66b, 66c, 66d, and 66e (collectively, fastening apertures 66) for receiving respective fastening elements 64a, 64b, 64c, 64d, and 64e. Panel 26 may include a plurality of fastening apertures 68a, 68b, 68c, 68d, and 68e (collectively, fastening apertures 68) for receiving respective fastening elements 64a, 64b, 64c, 64d, and 64e. Fastening elements 64a, 64b, 64c, 64d, and 64e may be affixed to a plurality of respective securing elements 70a, 70b, 70c, 70d, and 70e (collectively, securing elements 70) (e.g., lock nuts) disposed on the top surface 30 of the panel 26. For example, securing elements 70a, 70b, 70c, 70d, and 70e may be #8-32 Nylon lock nuts, although other types of nuts or similar securing elements or devices may be used without deviating from the scope of the present disclosure.

In some embodiments, each of the securing elements 70a, 70b, 70c, 70d, and 70e may include and or be affixed to a respective plurality of spacing elements 72a, 72b, 72c, 72d, and 72e (collectively, spacing elements 72), e.g., flat washers, disposed between the top surface 30 of panel 26 and the securing elements 70a, 70b, 70c, 70d, and 70e (e.g., lock nuts), with each of the fastening elements 64 being disposed in the opening of the respective spacing elements 72. The spacing elements 72 may provide additional support and/or stability for the system 10 and/or may prevent overtightening. Additional or fewer spacing elements 72 (e.g., washers) of various types and sizes may be used without deviating from the scope of the invention. For example, in some embodiments, spacing elements 72 may include one or more of a M4 Zinc-Plated Split Lock Washer, a Flat Washer, and/or a 5/16 in.×1½ in. Fender Flat Washer, and locking elements 70 may include a 4 mm-0.7 Stainless Steel Metric Hex Nut.

Referring still to FIG. 4, panel 26 includes fastening apertures 74a and 74b (collectively, fastening apertures 74) for receiving anchoring elements 34a and 34b (collectively, anchoring elements 34). Anchoring elements 34a and 34b (which may be, e.g., eye bolts or may be other anchoring elements) may be coupled to couplings 36a and 36b (collectively, couplings 34) (which may be, e.g., hanger wire, rope, cabling, etc.). For example, one end 76a and 76b of couplings 36a and 36b may be wrapped through, around, etc., the openings 78a and 78b of anchoring elements 34a and 34b. Another end 80a and 80b of couplings 36a and 36b may be coupled to at least one structural support element 38. More or fewer than two couplings 36 and/or anchoring elements 34 may be used without deviating from the scope of the present disclosure.

Side 50a of panel 26 includes fastening apertures 82a, 82b, 82c, and 82d for receiving fastening elements 32a, 32b, 32c, and 32d. Side 50b of panel 26 includes fastening apertures 84a and 84b for receiving fastening elements 32e and 32f. Sides 50c and 50d of panel 26, opposite sides 50a and 50b, respectively, may include similar fastening apertures for receiving respective fastening elements (not shown in FIG. 4). For example, fastening elements 32 may be lathe screws, e.g., ¾ in. sharp point lathe screws.

Figure 5:
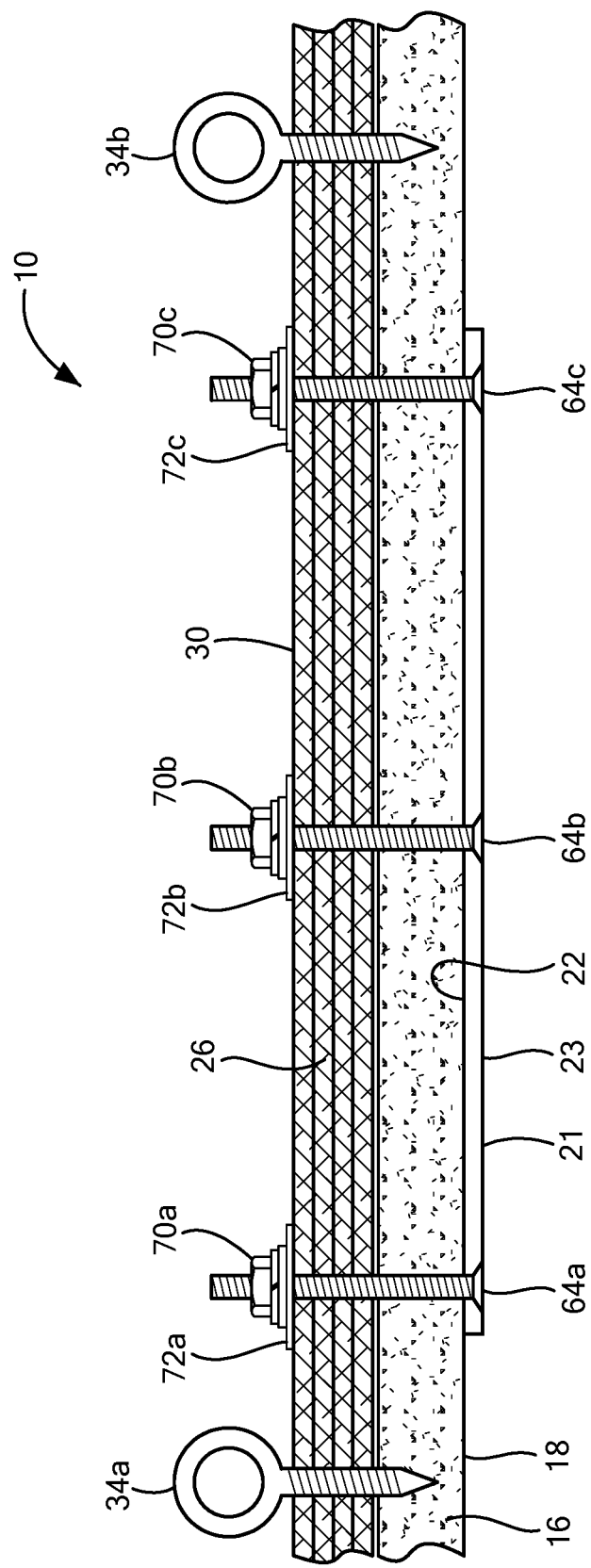
FIG. 5 is a block diagram that illustrates another example unmanned aerial vehicle docking station for a ceiling, according to some embodiments of the present disclosure.

FIG. 5 illustrates an example of a cross section of a portion of the premises security system 10 shown in FIG. 4. In FIG. 5, the anchoring elements 34a and 34b are disposed within the panel 26 (e.g., as a result of being drilled by an installer) and, in some embodiments, may further be disposed within at least portion of the ceiling element 16. The fastening elements 64a, 64b, and 64c affix the unmanned aerial vehicle mounting bracket 21 to the exposed surface 18 of ceiling element 16 (e.g., a ceiling tile). The ceiling element 16 is sandwiched between the unmanned aerial vehicle mounting bracket 21 below and the panel 26 above. The fastening elements 64a, 64b, and 64c pass through corresponding channels formed by the alignment of corresponding apertures in the unmanned aerial vehicle mounting bracket 21, ceiling element 16, and panel 26, which may be preformed and/or may be drilled during an installation procedure. The fastening elements 64*a*, 64*b*, and 64*c* are secured to the top surface 30 of the panel 26, such as by securing elements 70*a*, 70*b*, and 70*c*, and spacing elements 72*a*, 72*b*, and 72*c*.

Figure 6:
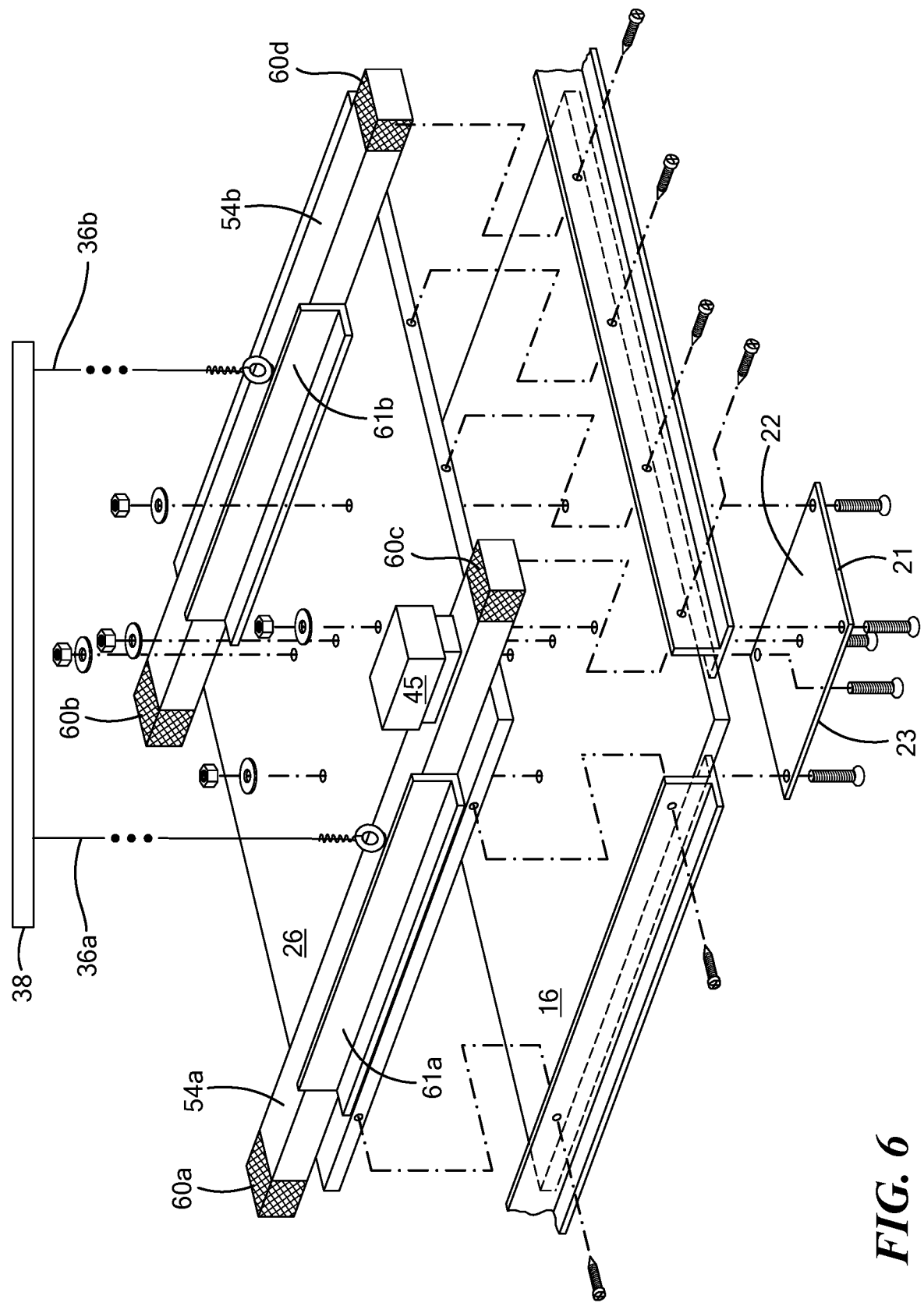
FIG. 6 is a block diagram that illustrates another example unmanned aerial vehicle docking station for a ceiling, according to some embodiments of the present disclosure.

FIG. 6 illustrates another example embodiment of the present disclosure. The embodiment of FIG. 6 is similar to the embodiment of FIG. 4, with the addition of cross braces 54*a* and 54*b* mounted to the ceiling grid 14 (e.g., to main beams 42*b* and 42*c*) via fastening elements 60*a*, 60*b*, 60*c*, and 60*d*, which may be clips, e.g., attached to first ends 56*a* and 56*b* and second ends 58*a* and 58*b*. The cross braces 54*a* and 54*b* are affixed to the panel 26 via, e.g., fastening elements 61*a* and 61*b* (e.g., angle braces). In some embodiments, cross braces 54*a* and 54*b* may include apertures 57*a* and 57*b*, respectively, which may be for receiving couplings 36*c* and 36*d* (e.g., cables, ropes, hanging wire, etc.). In some embodiments, power supply 45 may be affixed to one or more of the cross braces 54.

In an alternative embodiment, a portion of the ceiling grid 14 (e.g., one or more main beam 42, cross beams 44, etc.) may serve as the ceiling element 16, such that the top surface 22 of unmanned aerial vehicle mounting bracket 21 is affixed to a bottom surface of the ceiling grid 14, and the bottom surface 28 of the panel 26 is affixed a top surface of the ceiling grid 14, where fastening elements (e.g., screws, U-brackets, etc.) affix the unmanned aerial vehicle mounting bracket 21 to the ceiling grid 14 and the panel 26.

In an alternative embodiment, the unmanned aerial vehicle mounting bracket 21 may be affixed to the top surface 30 of panel 26, instead of being affixed to the bottom surface 23 of a first ceiling element 16. The unmanned aerial vehicle docking station 24 may be affixed to the unmanned aerial vehicle mounting bracket 21. An aperture may be cut in the ceiling element 16 to allow for the unmanned aerial vehicle 25 to enter the plenum space between the ceiling 12 and the roof of the building.

Figure 7:
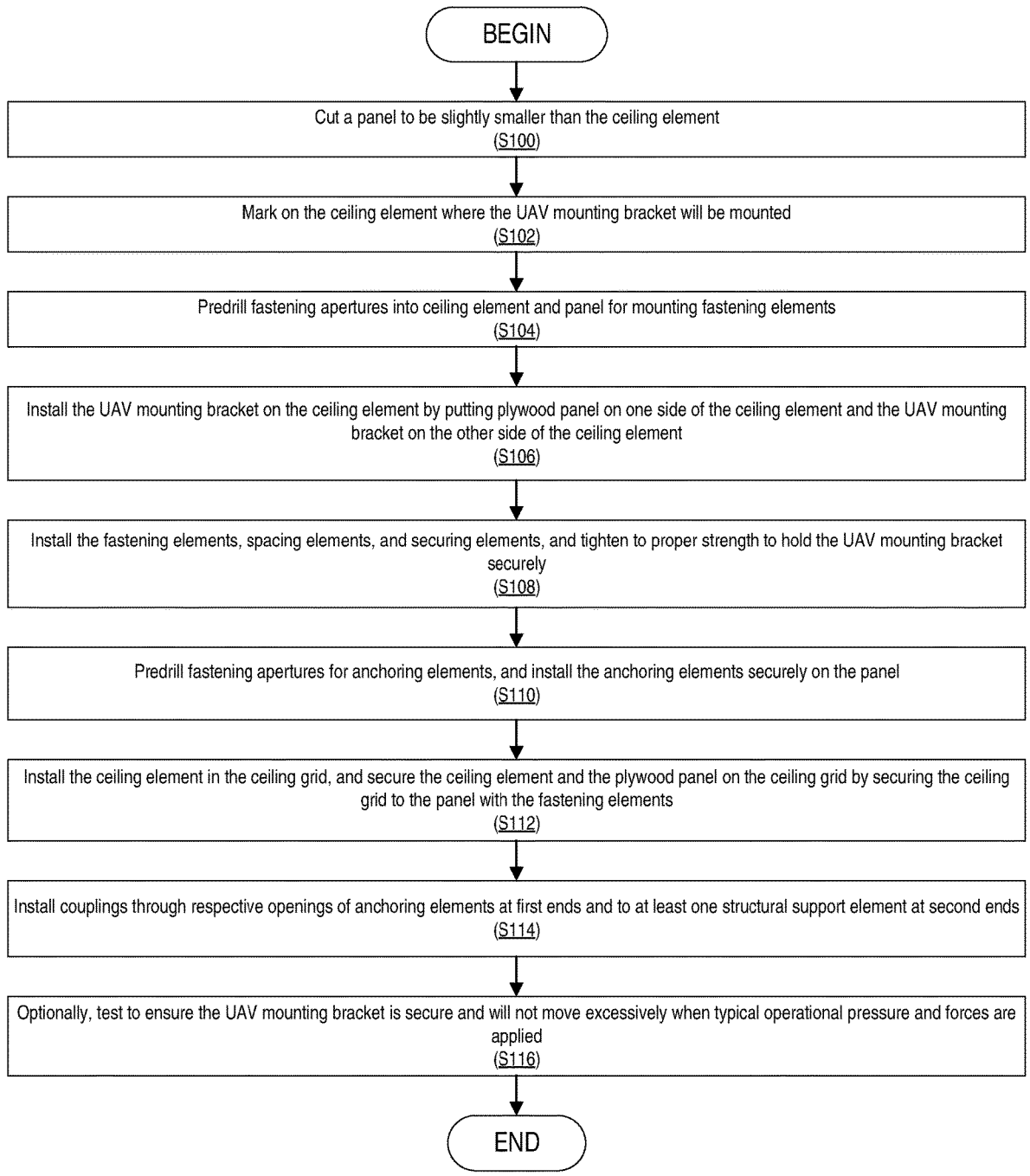
FIG. 7 is a flowchart that illustrates an example method for installing an apparatus for an example unmanned aerial vehicle docking station for a ceiling, according to some embodiments of the present disclosure.

FIG. 7 illustrates a flowchart of an example method according to some embodiments of the present disclosure. For example, the example method illustrated in FIG. 7 may be used to install a ceiling mounted unmanned aerial vehicle docking station 24 in a premise security system 10, e.g., as depicted in FIG. 4. A panel 26 (e.g., a plywood panel) is cut (Block S100) to be smaller than the ceiling element 16, as a non-limiting example, smaller by ⅟32 in. The installer marks (Block S102) on the ceiling element 16 where the unmanned aerial vehicle mounting bracket 21 will be mounted. The installer predrills (Block S104) fastening apertures into ceiling element 16 and panel 26 for mounting fastening elements 64. The installer installs (Block S106) the unmanned aerial vehicle mounting bracket 21 on the ceiling element 16 by putting plywood panel 26 on one side (concealed surface 20) of the ceiling element 16 and the unmanned aerial vehicle mounting bracket 21 on the other side (exposed surface 18) of ceiling element 16. The installer installs (Block S108) the fastening elements 64, spacing elements 72, and securing elements 70 (e.g., lock nuts), and tightens to proper strength to hold the unmanned aerial vehicle mounting bracket 21 securely. The installer predrills (Block S110) fastening apertures 74 for anchoring elements 34, and installs the anchoring elements 34 securely on the panel 26. The installer installs (Block S112) the ceiling element 16 in the ceiling grid 14 and secures the ceiling element 16 and the plywood panel 26 on the ceiling grid 14 by securing the ceiling grid 14 to the panel 26 with the fastening elements 32, which may be lathe screws. In some embodiments, a total of 12 fastening elements 32 may be utilized. The installer installs (Block S114) couplings 36 (e.g., hanger wire) through respective openings 78 of anchoring elements 34 at first ends 76 and to at least one structural support element 38 at second ends 80. Optionally, the installer may test (Block S116) to ensure the unmanned aerial vehicle mounting bracket 21 is secure and will not move excessively when typical operational pressure and forces are applied, e.g., by the weight of the unmanned aerial vehicle docking station 24 which is affixed to the unmanned aerial vehicle mounting bracket 21, by the forces caused by an unmanned aerial vehicle docking and undocking, which may be a magnetic docking and/or undocking procedure, etc.

Figure 8:
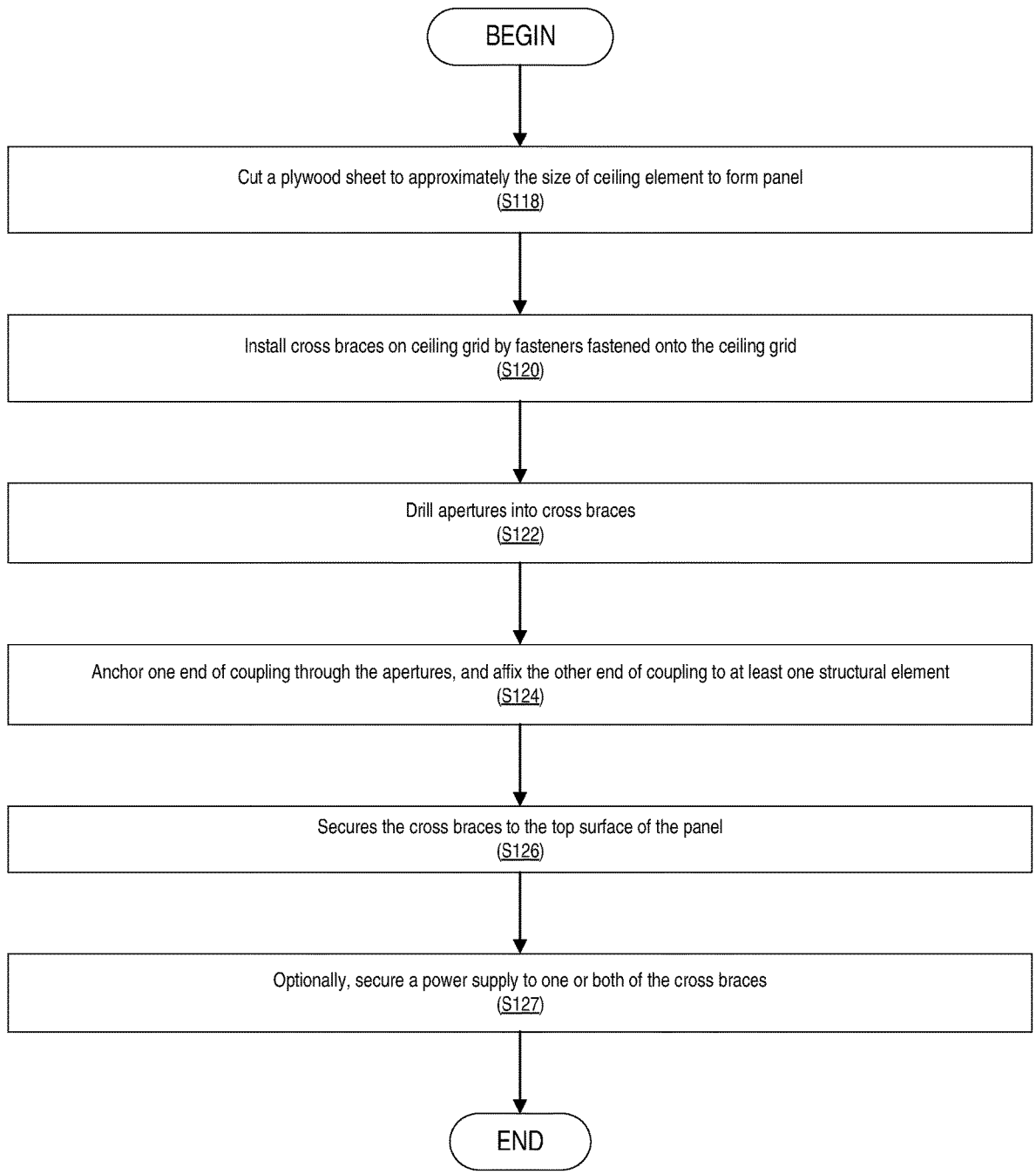
FIG. 8 is another flowchart that illustrates an example method for installing an apparatus for an example unmanned aerial vehicle docking station for a ceiling, according to some embodiments of the present disclosure.

FIG. 8 illustrates a flowchart of an example method according to some embodiments of the present disclosure. For example, the example method illustrated in FIG. 8 may be used to install a ceiling mounted unmanned aerial vehicle docking station 24 in a premises security system 10, e.g., as depicted in FIG. 6. In a first step, an installer cuts (Block S118) a plywood sheet to approximately the size of ceiling element 16 to form panel 26. The installer installs (Block S120) cross braces 54*a* and 54*b* on ceiling grid 14 by fastening elements 60 (e.g., clips) fastened onto the ceiling grid 14. The installer drills (Block S122) apertures into cross braces 54. The installer anchors (Block S124) one end 76 of coupling 36 through the apertures, and the other end 80 of coupling 36 is affixed to at least one structural element 38. The installer secures (Block S126) the cross braces 54*a* and 54*b* to the top surface 30 of the panel 26. Optionally, the installer secures (Block S127) a power supply 45 to one or both of the cross braces 54*a* and 54*b*.

As discussed herein, ceiling mounted unmanned aerial vehicles, e.g., unmanned aerial mounted vehicles which mount (connectively couple) to a docking station (charging station) which is attached to a ceiling, present particular challenges, such as maintaining stability in response to upward and downward forces. In some scenarios, a ceiling tile mount may be impractical. For example, a structure may lack a suspended ceiling. Thus, a vertical wall mounted solution for a ceiling mounted unmanned aerial vehicle docking station may be beneficial for some applications and settings.

Figure 9:
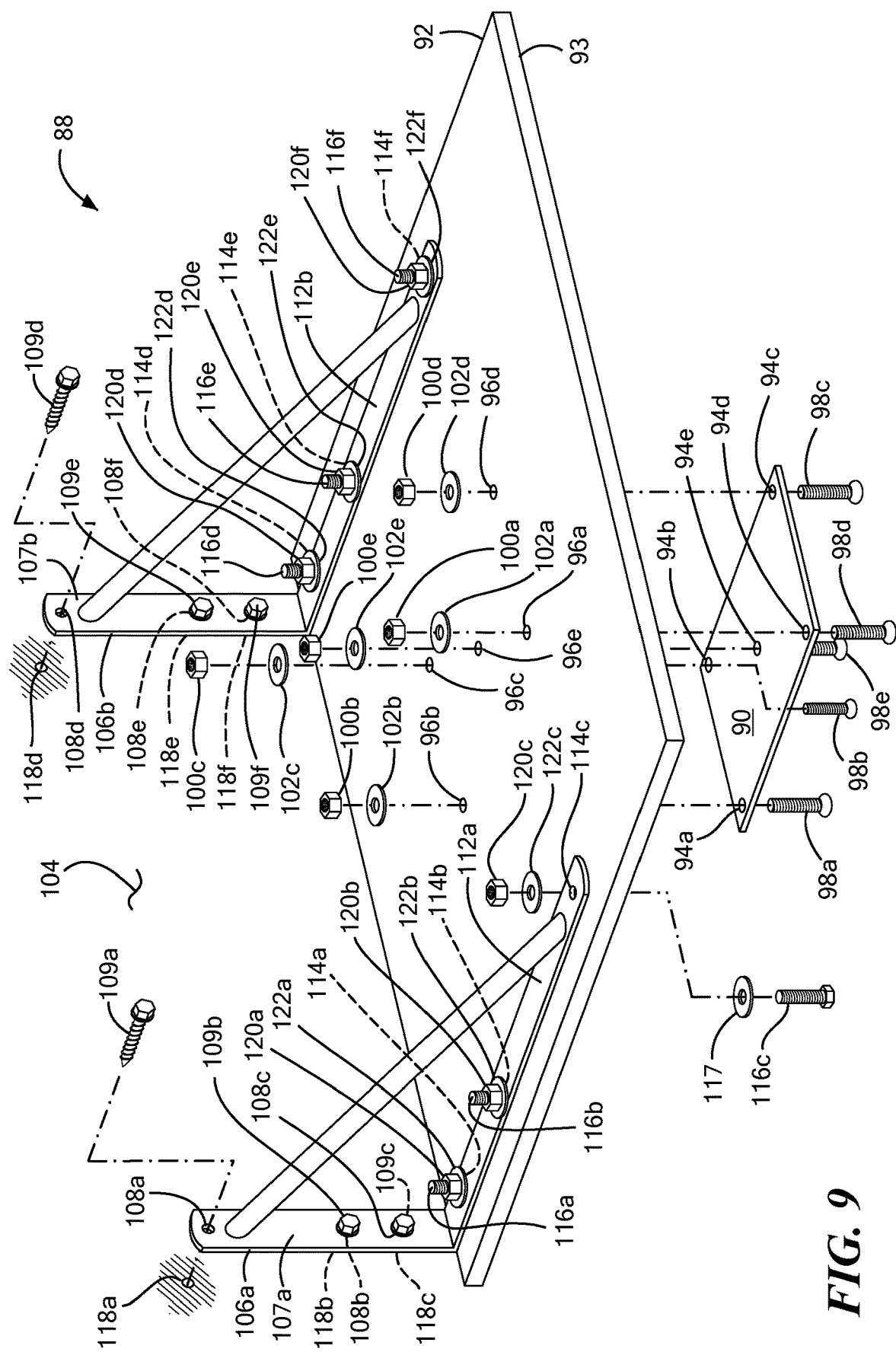
FIG. 9 is a block diagram that illustrates another example unmanned aerial vehicle docking station for a ceiling, according to some embodiments of the present disclosure.

FIG. 9 is an illustration of an example vertical wall mount system 88 for an unmanned aerial vehicle mounting bracket 90 according to some embodiments of the present disclosure. In the example of FIG. 9, the unmanned aerial vehicle mounting bracket 90 may have been designed (e.g., by an unmanned aerial vehicle manufacturer) to be mounted on a ceiling, and may require adaptation according to embodiments of the present disclosure in order to be installed in a premises which lacks a suitable ceiling for mounting. Thus, in the example of FIG. 9, the unmanned aerial vehicle mounting bracket 90 is affixed to a panel 92, which includes a bottom surface 93. Unmanned aerial vehicle mounting bracket 90 may include fastening apertures 94*a*, 94*b*, 94*c*, 94*d*, and 94*e* (collectively, fastening apertures 94), and panel 92 may include fastening apertures 96*a*, 96*b*, 96*c*, 96*d*, and 96*e* (collectively, fastening apertures 96), for respective fastening elements 98*a*, 98*b*, 98*c*, 98*d*, and 98*e* (collectively, fastening elements 98) (e.g., M4 screws). Securing elements 100*a*, 100*b*, 100*c*, 100*d*, 100*e* (collectively, securing elements 100) (e.g., locking nuts, 4 mm-0.7 stainless steel metric hex nuts, etc.) and spacing elements 102*a*, 102*b*, 102*c*, 102*d*, and 102*e* (collectively, spacing elements 102) (e.g., one or more washers, M4 Zinc-Plated split lock washers, flat washers, 5/16 in.×1½ in. Fender Flat Washer, etc.) secure the respective fastening elements 98a, 98b, 98c, 98d, and 98e. Thus, the unmanned aerial vehicle mounting bracket 90 is secured to a bottom surface 93 of panel 92. Although this example includes five fastening elements 98, more or fewer fastening elements (and/or corresponding fastening apertures 96, securing elements 100, and spacing elements 102), may be used without deviating from the scope of the present disclosure.

Still referring to FIG. 9, panel 92 is secured to a wall 104 (which may be, e.g., a concrete wall, a brick wall, etc.) suitable for supporting the weight of an unmanned aerial vehicle docking station (not shown) which attaches to the unmanned aerial vehicle mounting bracket 90. Panel 92 is secured to the wall 104 via a first angle bracket 106a and a second angle bracket 106b (collectively, angle brackets 106), which may be, e.g., 20 in.×13 in. heavy-duty shelf brackets. Angle bracket 106a includes a vertical member 107a including plurality of fastening apertures 108a, 108b, 108c, and second angle bracket 106b includes a vertical member 107b including plurality of fastening apertures 108d, 108e, and 108f (collectively, fastening apertures 108), through which fastening elements 109a, 109b, 109c, 109d, 109e, and 109f (collectively, fastening elements 109) (e.g., 3/16 inc.×1¾ inc. Hex-Washer-Head Concrete Anchors) are inserted to secure the angle brackets 106 to drill apertures in the wall 104 for inserting the respective fastening elements 109.

Angle bracket 106a further includes a horizontal member 112a including a plurality of fastening apertures 114a, 114b, and 114c, and angle bracket 106b further includes a horizontal member 112b including a plurality of fastening apertures 114d, 114e, and 114f (collectively, fastening apertures 114), through which fastening elements 116a, 116b, 116c, 116d, 116e, and 116f (collectively, fastening elements 116) (e.g., ¼ in.-20×1½ in. Zinc Plated Hex Bolt) are inserted to secure the angle brackets 106 to panel 26. In this example, panel 26 includes fastening apertures 118a, 118b, 118c, 118d, 118e, and 118f (collectively, fastening apertures 118), and fastening elements 116a, 116b, 116c, 116d, 116e, and 116f, which may be affixed to one or more spacing elements 117 (e.g., ¼ in.×1¼ in. Zinc-Plated Fender Washers) on a bottom surface 93 of panel 92, are inserted into fastening apertures 118a, 118b, 118c, 118d, 118e, and 118f to secure them to respective securing elements 120a, 120b, 120c, 120d, 120e, and 120f (collectively, securing elements 120) (e.g., ¼ in.-20 Stainless Steel Nylon Lock Nut). Spacing elements 122a, 122b, 122c, 122d, 122e, and 122f (collectively, spacing elements 122) (e.g., ¼ in.×1¼ in. Zinc-Plated Fender Washers) may be included to provide additional stabilization and/or reduce overtightening. In some embodiments, horizontal members 112a and 112b may be substantially perpendicular to vertical members 107a and 107b. Although this example depicts two angle brackets 106, more or fewer angle brackets 106 (and/or fastening apertures 108, fastening elements 109, fastening apertures 114, fastening elements 116, spacing elements 117, fastening apertures 118, securing elements 120, and spacing elements 122) may be used without deviating from the scope of the present disclosure. Further, although angle brackets 106 are shown as being bent at an approximately 90-degree angle with respect to the vertical members 107 and horizontal members 112, other angles or shapes of the angle brackets 106 may be used without deviating from the scope of the present disclosure.

Figure 10:
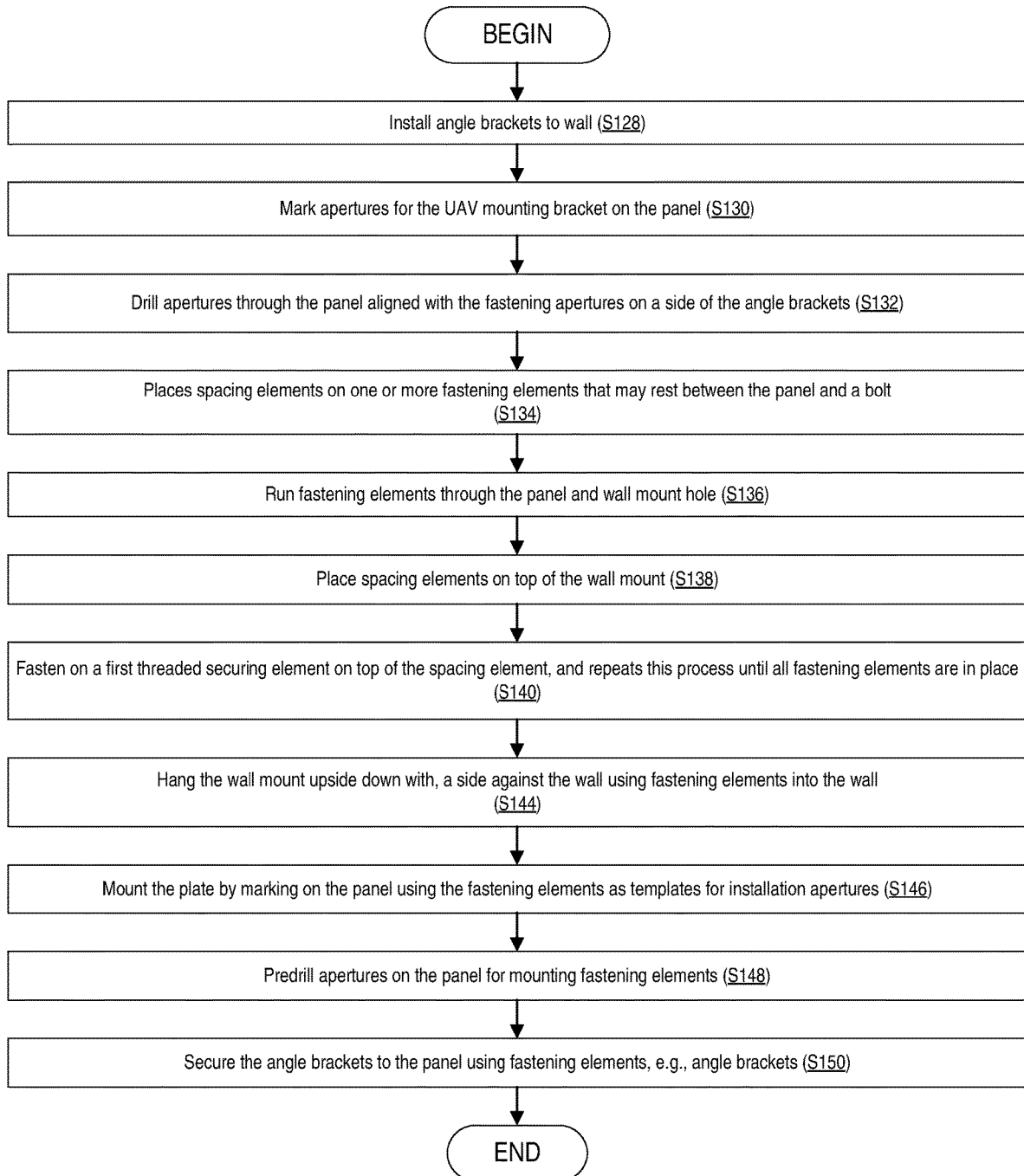
FIG. 10 is a flowchart that illustrates an example method for installing an apparatus for an example unmanned aerial vehicle docking station for a wall, according to some embodiments of the present disclosure.

FIG. 10 illustrates a flowchart of an example method according to some embodiments of the present disclosure.

For example, the example method illustrated in FIG. 8 may be used to install a vertical wall mount 88 for an unmanned aerial vehicle mounting bracket 90 in a premises security system 10, e.g., as depicted in FIG. 9. In a first step, an installer installs (Block S128) angle brackets 106a and 106b, which may be, e.g., 20 in.×13 in. heavy-duty shelf brackets, to wall 104. Other sizes and proportions of angle brackets may be used without deviating from the scope of the present disclosure. The angle brackets 106a and 106b may be disposed a distance, e.g., ½ in., from each edge of the panel 92. The installer marks (Block S130) apertures for the unmanned aerial vehicle mounting bracket 90 on the panel 92. The installer drills (Block S132) apertures through the panel 92 aligned with the fastening apertures 108a, 108b, 108c, 108d, 108e, and 108f on a side (vertical members 107) of the angle brackets 106. The installer places (Block S134) spacing elements 117 (e.g., fender washers) on one or more fastening elements that may rest between the panel 92 and a fastening elements 116 (e.g., as bolt). The installer runs (Block S136) fastening elements 116 through the panel 92 and wall mount apertures. The installer places (Block S138) spacing elements 122 on top of the wall mount. The installer fastens (e.g., screws) (Block S140) on a first threaded securing element (e.g., locking nut) 120 on top of the spacing element 122 (e.g., fender washers), and repeats this process until all fastening elements 116 are in place. The installer hangs (Block S144) the wall mount "upside down" with, e.g., a second side (vertical member 107) against the wall using fastening elements 109, e.g., anchoring screws, into the wall 104. The installer mounts the plate by marking (Block S146) on the panel 92 using the fastening elements (e.g., angle brackets) 106 as templates for installation apertures (holes). The installer predrills (Block S148) apertures on the panel 92 for mounting fastening elements (e.g., screws), for example, using a 11/64 in. drill bit. The installer secures (Block S150) the angle brackets 106 to the panel 92 using fastening elements 116 (e.g., screws), and optionally, spacing elements 122 (e.g., 5/16 in.×1½ in. Fender Flat washers), against panel 92, optionally utilizing additional smaller spacing elements (e.g., washers, such as M4 Zinc-Plated Split Lock Washers), and utilizing a securing element 120, such as a locking nut, e.g., a 4 mm-0.7 Stainless Steel Metric Hex Nut. In some embodiments, it may be necessary to avoid tightening a threaded nut on the various fastening elements (e.g., fastening elements 116). A threaded nut may be used to secure a lock washer to one or more additional washers.

Figure 11:
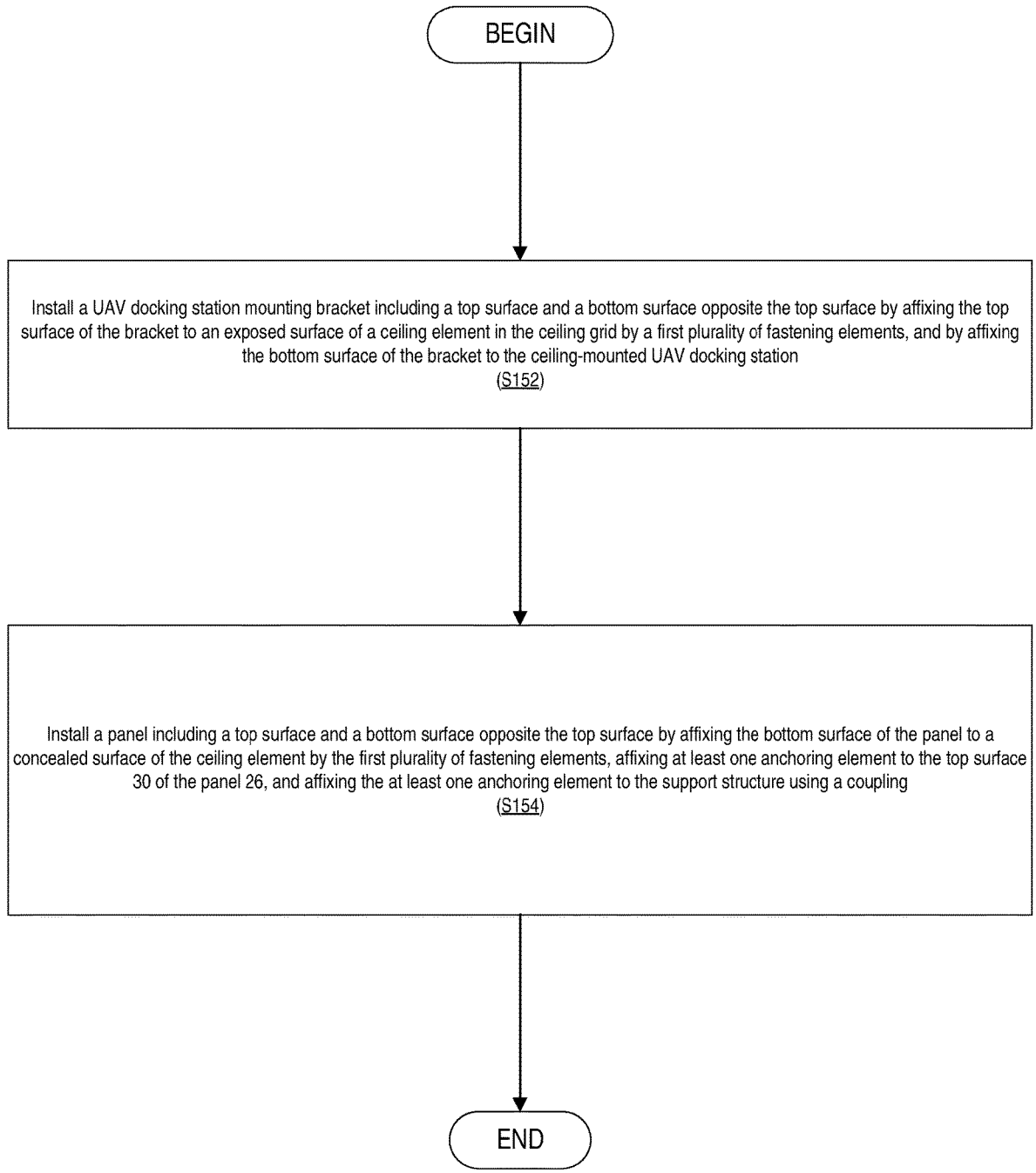
FIG. 11 is a flowchart that illustrates an example method for installing an apparatus for an example unmanned aerial vehicle docking station for a ceiling, according to some embodiments of the present disclosure.

FIG. 11 is a flowchart of an example method for installing an apparatus for supporting a ceiling mounted unmanned aerial vehicle docking station 24 in a premises security system 10 for a premises, where the premises includes a ceiling 12 with a ceiling grid 14 and a support structure 38 disposed above the ceiling grid 14. The installer installs (Block S152) an unmanned aerial vehicle docking station mounting bracket 21 including a top surface 22 and a bottom surface 23 opposite the top surface 22 by affixing the top surface 22 of the bracket 21 to an exposed surface 18 of a ceiling element 16 in the ceiling grid 14 by a first plurality of fastening elements 64, and by affixing the bottom surface 23 of the bracket 21 to the ceiling mounted unmanned aerial vehicle docking station 24. The installer installs (Block S154) a panel 26 including a top surface 30 and a bottom surface 28 opposite the top surface 30 by affixing the bottom surface of the panel to a concealed surface of the ceiling element 16 by the first plurality of fastening elements 64, affixing at least one anchoring element 34 to the top surface 30 of the panel 26, and affixing the at least one anchoring element 34 to the support structure 38 using a coupling 36.

It is to be understood that the particular examples provided with respect to FIGS. 1-10 are non-limiting with respect to, e.g., the numbers, types, and/or dimensions of screws, fastening elements, fastening apertures, brackets, braces, panels, etc., and embodiments of the present disclosure may utilize any number of such elements which is sufficient to provide adequate support to a ceiling mounted unmanned aerial vehicle docking station and which may be efficiently installed. For example, a lighter ceiling mounted unmanned aerial vehicle docking station may only require 3 fastening elements for securing the unmanned aerial vehicle docking station bracket to a ceiling tile and panel, whereas a heavier system may require 7 fastening elements.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for installing an apparatus for supporting a ceiling mounted unmanned aerial vehicle docking station in a premises security system for a premises, the premises comprising a ceiling grid and a support structure disposed above the ceiling grid, the method comprising:
    installing an unmanned aerial vehicle docking station mounting bracket comprising a top surface and a bottom surface opposite the top surface by:
        affixing the top surface of the bracket to an exposed surface of a ceiling element in the ceiling grid by a first plurality of fastening elements; and
        affixing the bottom surface of the bracket to the ceiling mounted unmanned aerial vehicle docking station; and
    installing a panel comprising a top surface and a bottom surface opposite the top surface by:
        affixing the bottom surface of the panel to a concealed surface of the ceiling element by the first plurality of fastening elements;
        affixing at least one anchoring element to the top surface of the panel; and
        affixing the at least one anchoring element to the support structure using a coupling.

2. The method of claim 1, wherein the ceiling element is a ceiling tile.

3. The method of claim 1, wherein the at least one anchoring element includes at least one eye bolt, the method further comprising:
    inserting the at least one eye bolt in the top surface of the panel;
    affixing the at least one eye bolt to a first end of the coupling; and
    affixing a second end of the coupling to the support structure.

4. The method of claim 3, wherein the coupling comprises a hanging wire.

5. The method of claim 1, wherein the method further comprises:
    affixing a cross brace to the top surface of the panel,
    affixing the cross brace to at least one of a main beam and a cross beam of the ceiling grid;
    affixing at least anchoring element to the cross brace,
    affixing the at least one anchoring element to a first end of a coupling; and
    affixing a second end of the coupling to the support structure.

6. The method of claim 5, further comprising affixing a power supply for the unmanned aerial vehicle docking station to the cross brace.

7. The method of claim 5, wherein the at least one anchoring element comprises an eye bolt, and the coupling comprises a hanging wire.

8. The method of claim 1, wherein the panel is a rectangular shape which has substantially the same length and width as the ceiling element.

9. The method of claim 1, further comprising affixing the unmanned aerial vehicle mounting bracket to an unmanned aerial vehicle docking station, the unmanned aerial vehicle docking station comprising a magnetic docking element for magnetically securing a premises security unmanned aerial vehicle during a docking procedure or an undocking procedure.

* * * * *